US010438386B2

(12) United States Patent
Ni et al.

(10) Patent No.: US 10,438,386 B2
(45) Date of Patent: Oct. 8, 2019

(54) DATA VISUALIZATION METHOD AND APPARATUS

(71) Applicant: HUAWEI TECHNOLOGIES CO., LTD., Shenzhen, Guangdong (CN)

(72) Inventors: Bing Ni, Chenzhen (CN); Mingxuan Yuan, Hong Kong (CN); Huamin Qu, Hong Kong (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/952,518

(22) Filed: Apr. 13, 2018

(65) Prior Publication Data
US 2018/0232917 A1 Aug. 16, 2018

Related U.S. Application Data

(63) Continuation of application No. PCT/CN2015/091853, filed on Oct. 13, 2015.

(51) Int. Cl.
G06T 11/20 (2006.01)

(52) U.S. Cl.
CPC .................. G06T 11/206 (2013.01)

(58) Field of Classification Search
CPC ..................................................... G06T 11/206
See application file for complete search history.

(56) References Cited

U.S. PATENT DOCUMENTS

| 8,108,241 | B2 | 1/2012 | Shukoor |
| 2003/0236588 | A1* | 12/2003 | Jang ...................... B82Y 30/00 700/119 |

(Continued)

FOREIGN PATENT DOCUMENTS

| CN | 102629271 A | 8/2012 |
| CN | 104899288 A | 9/2015 |

OTHER PUBLICATIONS

Title: Plot bands and plot lines, Author: Highcharts, Date: Aug. 22, 2013; Source: https://www.highcharts.com/docs/chart-concepts/plot-bands-and-plot-lines & https://www.highcharts.com/docs/chart-and-series-types/areaspline-chart (Year: 2013).*

(Continued)

*Primary Examiner* — Jwalant Amin
(74) *Attorney, Agent, or Firm* — Womble Bond Dickinson (US) LLP

(57) ABSTRACT

The present disclosure provides a data visualization method and apparatus. The method includes: displaying a distribution curve diagram by using a display device, where the distribution curve diagram is used to represent time-based distribution of multiple pieces of spatial-temporal data, and the distribution curve diagram includes a timeline, a curve changing with the timeline, and an irregular region enclosed by the curve; and displaying a tree map in the irregular region by using the display device, where the tree map divides the irregular region into m sub-regions that are in a one-to-one correspondence with m regions, and an area of each of the m sub-regions is used to indicate an amount of spatial-temporal data distributed in a region corresponding to each sub-region. The present disclosure implements visualization of spatial-temporal data by using the tree map.

15 Claims, 5 Drawing Sheets

(56) References Cited

U.S. PATENT DOCUMENTS

2008/0046816 A1* 2/2008 Cao .................. G06F 9/451
715/853
2011/0261049 A1 10/2011 Cardno et al.
2013/0289945 A1 10/2013 Ball et al.
2016/0225171 A1* 8/2016 Lentz .................. G06T 11/206

OTHER PUBLICATIONS

Title: Treennap vs Bar chart—The end of Treemap, Author: Laszlo, Date: Dec. 16, 2014; Source: https://www.theinformationlab.co.uk/2014/12/16/treennap-vs-bar-chart-end-treennap/ (Year: 2014).*

* cited by examiner

DATA VISUALIZATION METHOD AND APPARATUS

CROSS-REFERENCE TO RELATED APPLICATIONS

This application is a continuation of International Application No. PCT/CN2015/091853, filed on Oct. 13, 2015, the disclosure of which is hereby incorporated by reference in its entirety.

TECHNICAL FIELD

Embodiments of the present disclosure relate to the visualization field, and more specifically, to a data visualization method and apparatus.

BACKGROUND

With development of wireless communications technologies and popularization of an intelligent terminal device, big data has emerged. In the big data era, a large amount of spatial-temporal data is generated every day. The spatial-temporal data is data including temporal and spatial information, such as data that is recorded by a base station in a wireless network and that includes a time and a location at which a user makes a phone call, and user sign-in data on a social network. Spatial-temporal data can well reflect a habit and a regularity of work, social activities, and life of a person, and therefore, visualization of spatial-temporal data is a research focus in a visualization field.

A tree map is a data display manner commonly used in the visualization field. FIG. 1 shows a conventional tree map form. Specifically, FIG. 1 is a distribution diagram of population density in the USA. A level-1 rectangle indicates a distribution status of the population in the USA at a state level (for example, California), and a rectangle corresponding to each state is further divided into smaller rectangles indicating a population distribution status of the state at a city level. A conventional tree map can visually and directly display data distribution based on only one dimension (for example, in FIG. 1, the data distribution is represented only based on a region dimension). However, spatial-temporal data includes both time-domain information and region information, and the conventional tree map cannot be applied to visualization of spatial-temporal data.

SUMMARY

Embodiments of the present disclosure provide a data visualization method and apparatus, so as to implement visualization of spatial-temporal data by using a tree map.

According to a first aspect, a data visualization method is provided, including: obtaining multiple pieces of spatial-temporal data, where each of the multiple pieces of spatial-temporal data records a time and a location at which an event occurs, locations recorded by the multiple pieces of spatial-temporal data are distributed in m preset regions, and m≥2; determining time-based distribution of the multiple pieces of spatial-temporal data according to time recorded by the multiple pieces of spatial-temporal data; displaying a distribution curve diagram by using a display device, where the distribution curve diagram is used to represent the time-based distribution of the multiple pieces of spatial-temporal data, and the distribution curve diagram includes a timeline, a curve changing with the timeline, and an irregular region enclosed by the curve; determining distribution of the multiple pieces of spatial-temporal data in the m regions according to the locations recorded by the multiple pieces of spatial-temporal data; and displaying, by using the display device, a tree map in the irregular region according to the distribution of the multiple pieces of spatial-temporal data in the m regions, where the tree map divides the irregular region into m sub-regions that are in a one-to-one correspondence with the m regions, and an area of each of the m sub-regions is used to indicate an amount of spatial-temporal data distributed in a region corresponding to each sub-region.

With reference to the first aspect, in an implementation of the first aspect, the timeline is a circular timeline based on polar coordinates, the curve is located in a circle enclosed by the circular timeline, and the irregular region is enclosed by the curve and radii of the circle.

With reference to the first aspect, in another implementation of the first aspect, the timeline is a rectilinear coordinate axis, and the irregular region is enclosed by the curve, the rectilinear timeline, and a vertical line perpendicular to the timeline.

With reference to any one of the first aspect or the foregoing implementations, in another implementation of the first aspect, the multiple pieces of spatial-temporal data are spatial-temporal data in a first subset of a spatial-temporal data set, the spatial-temporal data set includes n subsets, the first subset is any subset in the n subsets, the n subsets are in a one-to-one correspondence with n consecutive time segments, and a time recorded by spatial-temporal data in each subset falls within a time segment corresponding to each subset; and the method further includes: displaying, on the timeline by using the display device, a distribution curve diagram and a tree map that are corresponding to another subset, other than the first subset, in the n subsets.

With reference to any one of the first aspect or the foregoing implementations, in another implementation of the first aspect, the timeline is a circular timeline based on polar coordinates, and a time corresponding to the circular timeline is 24 hours of a day.

According to a second aspect, a data visualization apparatus is provided, including: an obtaining module, configured to obtain multiple pieces of spatial-temporal data, where each of the multiple pieces of spatial-temporal data records a time and a location at which an event occurs, locations recorded by the multiple pieces of spatial-temporal data are distributed in m preset regions, and m≥2; a first determining module, configured to determine time-based distribution of the multiple pieces of spatial-temporal data according to time recorded by the multiple pieces of spatial-temporal data; a first display module, configured to display a distribution curve diagram by using a display device, where the distribution curve diagram is used to represent the time-based distribution of the multiple pieces of spatial-temporal data, and the distribution curve diagram includes a timeline, a curve changing with the timeline, and an irregular region enclosed by the curve; a second determining module, configured to determine distribution of the multiple pieces of spatial-temporal data in the m regions according to the locations recorded by the multiple pieces of spatial-temporal data; and a second display module, configured to display, by using the display device, a tree map in the irregular region according to the distribution of the multiple pieces of spatial-temporal data in the m regions, where the tree map divides the irregular region into m sub-regions that are in a one-to-one correspondence with the m regions, and an area of each of the m sub-regions is used to indicate an amount of spatial-temporal data distributed in a region corresponding to each sub-region.

With reference to the second aspect, in an implementation of the second aspect, the timeline is a circular timeline based on polar coordinates, the curve is located in a circle enclosed by the circular timeline, and the irregular region is enclosed by the curve and radii of the circle.

With reference to either of the second aspect or the foregoing implementation, in another implementation of the second aspect, the timeline is a rectilinear coordinate axis, and the irregular region is enclosed by the curve, the rectilinear timeline, and a vertical line perpendicular to the timeline.

With reference to any one of the second aspect or the foregoing implementations, in another implementation of the second aspect, the multiple pieces of spatial-temporal data are spatial-temporal data in a first subset of a spatial-temporal data set, the spatial-temporal data set includes n subsets, the first subset is any subset in the n subsets, the n subsets are in a one-to-one correspondence with n consecutive time segments, and a time recorded by spatial-temporal data in each subset falls within a time segment corresponding to each subset; and the apparatus further includes: a third display module, configured to display, on the timeline by using the display device, a distribution curve diagram and a tree map that are corresponding to another subset, other than the first subset, in the n subsets.

With reference to any one of the second aspect or the foregoing implementations, in another implementation of the second aspect, the timeline is a circular timeline based on polar coordinates, and a time corresponding to the circular timeline is 24 hours of a day.

In the embodiments of the present disclosure, a distribution curve diagram is used to display time-domain information of spatial-temporal data, a tree map is used to display region information of the spatial-temporal data, and a region change status of the spatial-temporal data with a time domain is displayed by combining the distribution curve diagram and the tree map, thereby implementing visualization of spatial-temporal data by using the tree map.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
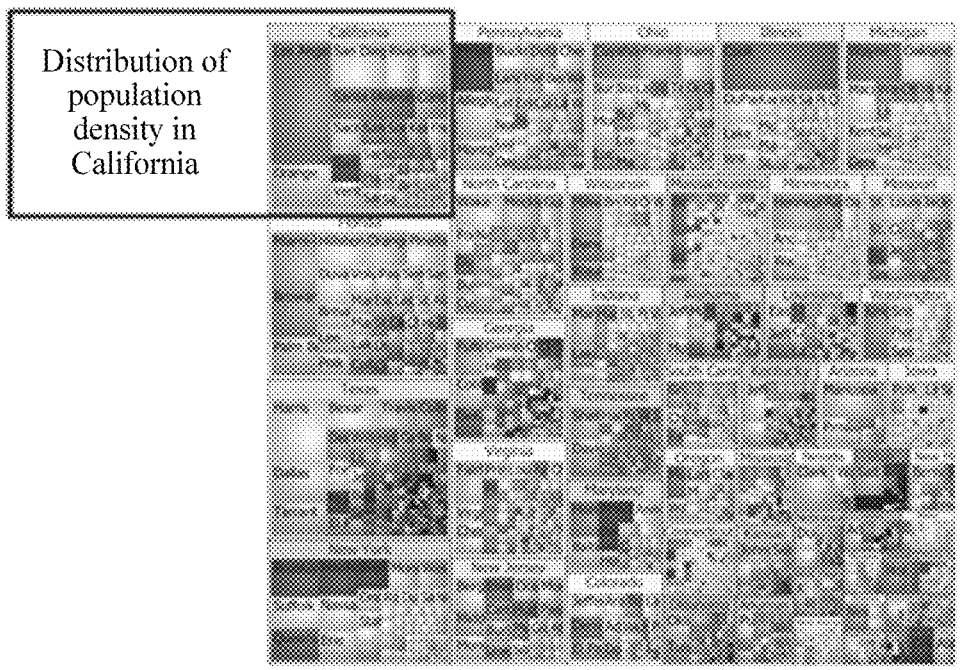
FIG. 1 is an example diagram of a conventional tree map.
Figure 2:
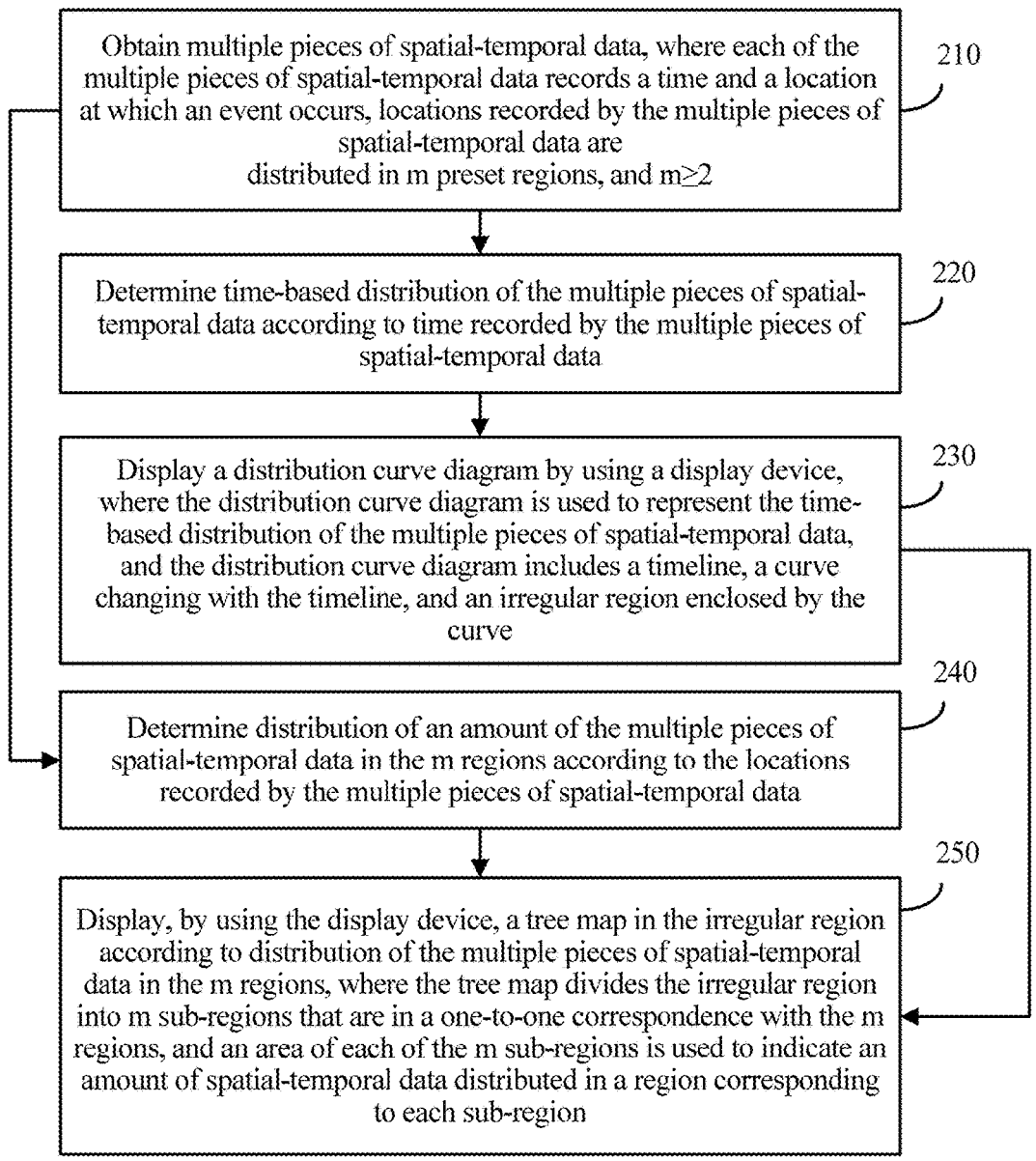
FIG. 2 is a schematic flowchart of a data visualization method according to an embodiment of the present disclosure.

FIG. 2 is a schematic flowchart of a data visualization method according to an embodiment of the present disclosure. The method in FIG. 2 includes the following steps.

At 210, multiple pieces of spatial-temporal data are obtained, where each of the multiple pieces of spatial-temporal data records a time and a location at which an event occurs, locations recorded by the multiple pieces of spatial-temporal data are distributed in m preset regions, and m≥2.

It should be understood that a type of the event is not specifically limited in this embodiment of the present disclosure. For example, the event may be an event related to an activity of the people, such as an event describing appearance or dining of the people at a specific place, or may be an event describing movement of the people, or may be a sign-in event on a social network.

At 220, time-based distribution of the multiple pieces of spatial-temporal data is determined according to time recorded by the multiple pieces of spatial-temporal data.

It should be understood that time-based distribution of an amount of spatial-temporal data may specifically indicate an amount of spatial-temporal data distributed at each time point or each time segment. For example, the foregoing multiple pieces of spatial-temporal data are distributed in 24 hours of a day, and the time-based distribution of the amount of spatial-temporal data can be obtained by calculating, according to the time recorded by the multiple pieces of spatial-temporal data, an amount of spatial-temporal data generated in each hour in the 24 hours. Certainly, during specific calculation, a time interval may be divided based on one hour, half an hour, or even one minute, and a shorter time division interval indicates more accurate distribution.

It should be understood that the time-based distribution of the foregoing multiple pieces of spatial-temporal data may indicate an amount or a frequency of the multiple pieces of spatial-temporal data at each time point or in each time segment.

At 230, a distribution curve diagram is displayed by using a display device, where the distribution curve diagram is used to represent the time-based distribution of the multiple pieces of spatial-temporal data, and the distribution curve diagram includes a timeline, a curve changing with the timeline, and an irregular region enclosed by the curve.

Figure 3:
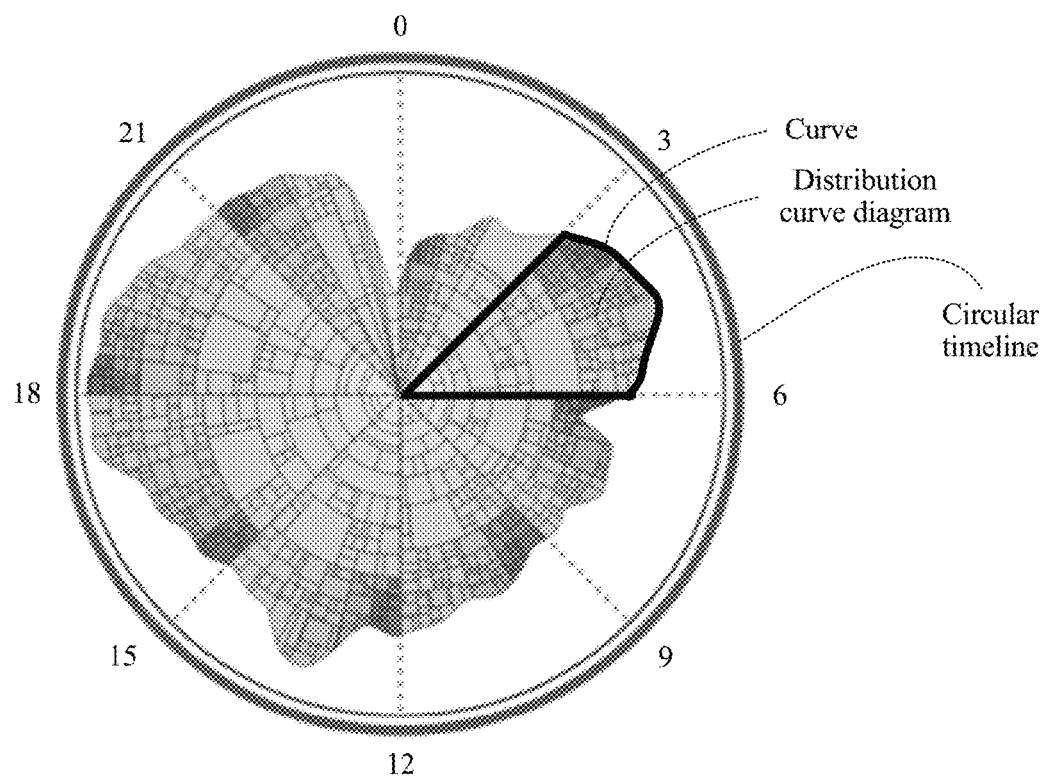
FIG. 3 is a schematic diagram of a tree map according to an embodiment of the present disclosure.
Figure 4:
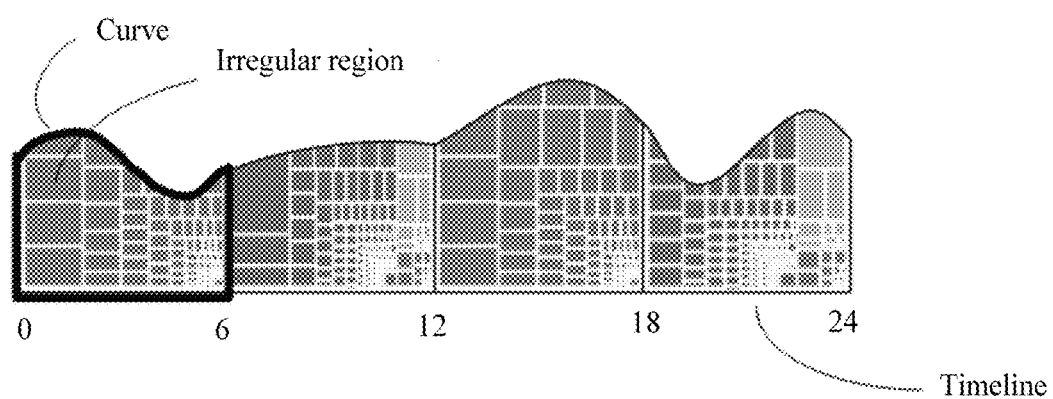
FIG. 4 is a schematic diagram of a tree map according to an embodiment of the present disclosure.

It should be understood that the foregoing curve and a shape of the irregular region are related to a specific form of the timeline. Specifically, referring to FIG. 3, the timeline may be a circular timeline based on polar coordinates. In this case, the curve in the distribution curve diagram may be a segment of curve within the circular timeline, and the curve may represent the time-based distribution of an amount of spatial-temporal data in a time segment (a time segment corresponding to a sector region including the curve) by using a change of a distance to a center of a circle; and the irregular region may be a region enclosed by connecting end to end the curve and two radii of the circle, and is an irregular sector region. As shown in FIG. 4, alternatively, the timeline may be a rectilinear coordinate axis (for example, a lateral axis). In this case, the curve may represent the time-based distribution of an amount of spatial-temporal data by using a change of a distance to the timeline; and the irregular region may be a region enclosed by connecting end to end the curve, the timeline, and a line segment perpendicular to the timeline, and is an irregular rectangle region.

It should be understood that a time corresponding to circumference of a circular coordinate axis may be 24 hours of a day, or may be a week, a month, or a year. This is not specifically limited in this embodiment of the present disclosure, and actually, the circumference may represent any time span.

At 240, distribution of the multiple pieces of spatial-temporal data in the m regions is determined according to the locations recorded by the multiple pieces of spatial-temporal data.

It should be understood that the distribution of the multiple pieces of spatial-temporal data in the m regions may specifically indicate an amount or a frequency of the multiple pieces of spatial-temporal data in the m regions. Specifically, the multiple pieces of spatial-temporal data may be traversed, a region including the location recorded by each piece of spatial-temporal data is determined as a region corresponding to the spatial-temporal data; and after all the pieces of spatial-temporal data are traversed, amounts of spatial-temporal data respectively corresponding to the m regions are obtained.

At 250, by using the display device, a tree map in the irregular region is displayed according to the distribution of the multiple pieces of spatial-temporal data in the m regions, where the tree map divides the irregular region into m sub-regions that are in a one-to-one correspondence with the m regions, and an area of each of the m sub-regions is used to indicate an amount of spatial-temporal data distributed in a region corresponding to each sub-region.

In this embodiment of the present disclosure, a distribution curve diagram is used to display time-domain information of spatial-temporal data, a tree map is used to display region information of the spatial-temporal data, and a region change of the spatial-temporal data with a time domain is displayed by combining the distribution curve diagram and the tree map, thereby implementing visualization of spatial-temporal data by using the tree map.

It should be understood that for a prior-art tree map, a regular rectangle region is divided; however, in this embodiment of the present disclosure, the tree map needs to be displayed in an irregular region, that is, division of an irregular region needs to be performed on the tree map. Certainly, there are many division manners, and a division may even be manually performed. With reference to a specific example, the following provides a new division manner, so as to display a tree map in an irregular region.

Optionally, in an embodiment, step 250 may include: deploying m points in the irregular region, where the m points are in a one-to-one correspondence with the m regions; determining a division location of the irregular region according to locations of the m points in the irregular region and distribution of an amount of the spatial-temporal data in the m regions, where the division location of the irregular region is used for dividing the irregular region into the m sub-regions, so that each of the m sub-regions includes one point in the m points; and displaying, by using the display device, the tree map obtained by dividing the irregular region according to the division location. The manner for dividing the irregular region in this embodiment of the present disclosure applies to displaying a tree map in an irregular region.

It should be understood that the deploying m points in the irregular region may be determining initial locations of the m points in the irregular region.

It should be noted that a manner for deploying the initial locations of the m points in the irregular region is not specifically limited in this embodiment of the present disclosure. For example, the location may be selected randomly, or may be determined according to a location relationship between the m regions indicated by the m points.

Optionally, in an embodiment, the determining a division location of the irregular region according to locations of the m points in the irregular region and distribution of an amount of the spatial-temporal data in the m regions may include:

Step A: Determine that the irregular region is a to-be-processed target region.

Step B: Determine a division direction of the target region according to a width-to-height ratio of the target region, where the division direction includes a latitudinal direction and a longitudinal direction, latitudinal division indicates dividing the target region into two along a width direction, and longitudinal division indicates dividing the target region into two along a height direction.

Step C: Determining a target division location of the irregular region in the division direction according to the locations of all the m points in the target region and an amount of spatial-temporal data that is in the multiple pieces of spatial-temporal data and that is distributed in the regions corresponding to all the points, where the target division location is selected, so that a difference between an area ratio and a target ratio of a first sub-region to a second sub-region that are of two sub-regions obtained by dividing the target region along the target division location is smallest, and the target ratio is a ratio of an amount of spatial-temporal data distributed in a region corresponding to a point in the first sub-region to an amount of spatial-temporal data distributed in a region corresponding to a point in the second sub-region.

Step D: Move a point in the irregular region according to a distance and a direction that are between a center line location of the target region in the division direction and the target division location.

Step E: When a quantity of points included in either of the two sub-regions is greater than 1, update the sub-region to the target region, and repeat step B to step D until the quantity of points included in either sub-region is 1.

Figure 5:
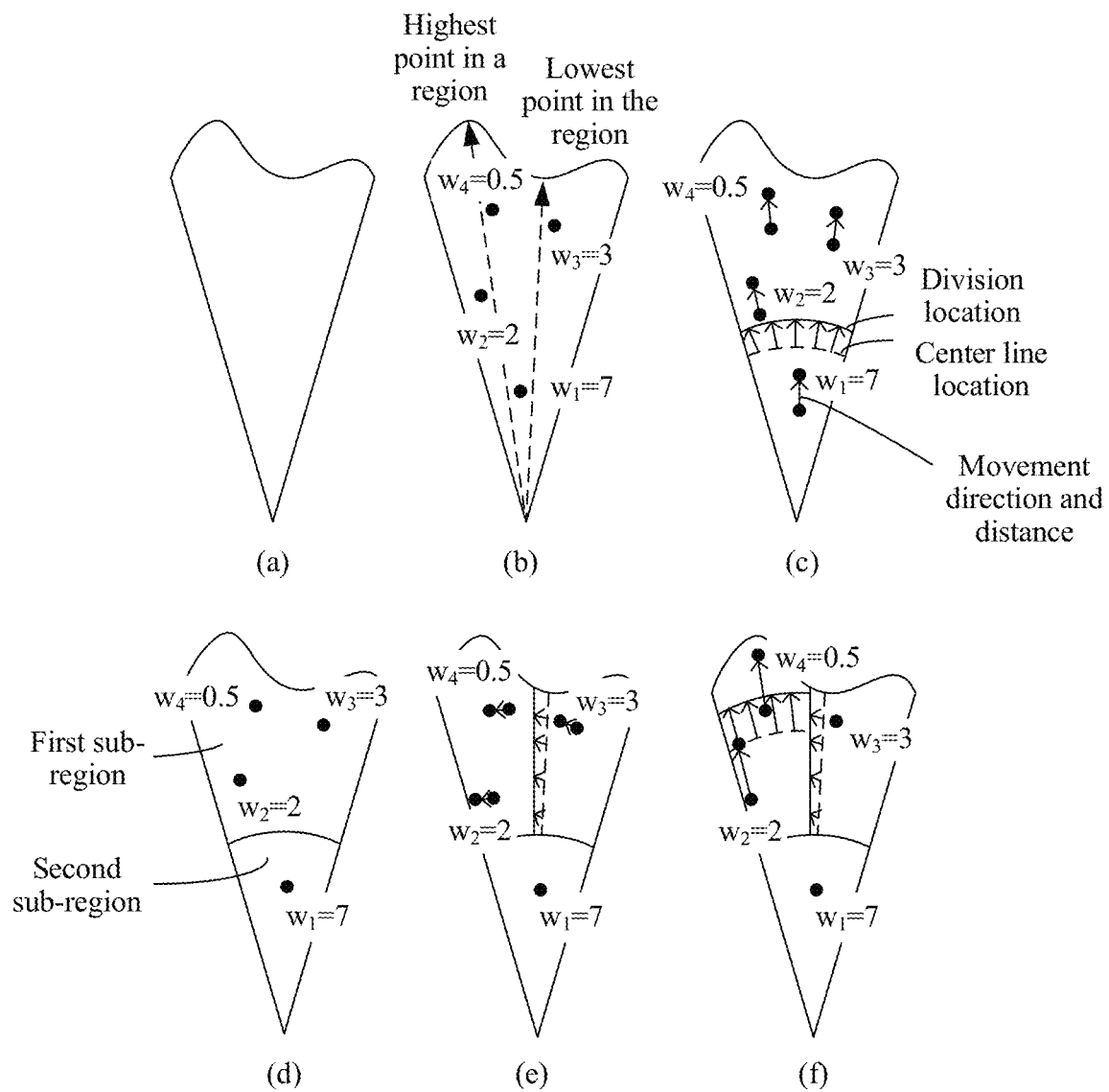
FIG. 5 is a schematic diagram of a process of dividing a tree map according to an embodiment of the present disclosure.

With reference to FIG. 5, the following uses an example in which the foregoing timeline is the circular timeline based on polar coordinates for description. FIG. 5 shows a process of dividing one irregular sector region. FIG. 5(*a*) is a to-be-divided sector region. It is assumed that m=4. The sector region in FIG. 5(*a*) needs to be divided into four sub-regions, and a specific division process is as follows:

Step 1: Deploy four points.

As shown in FIG. 5(*b*), the four points $w_1$, $w_2$, $w_3$, and $w_4$ correspond to a region 1, a region 2, a region 3, and a region 4 respectively, and initial locations of the four points may be determined randomly or may be determined in another manner. For example, it is assumed that each piece of spatial-temporal data in multiple pieces of spatial-temporal data records a start location and an end location of an event, all start locations of the multiple pieces of spatial-temporal data belong to a same reference region, and end locations are distributed in the region 1, the region 2, the region 3, and the region 4. In this case, the initial locations of the four points in the sector region may be determined according to a fact that the 4 regions are proportional to the reference region. For example, the four points $w_1$, $w_2$, $w_3$, and $w_4$ are deployed in the sector region in a manner in which distances from the region 1, the region 2, the region 3, and the region 4 to the reference region are in ascending order, so that distances from the four points to a center of a circle are in ascending order. Certainly, latitudinal locations of the four points in the sector region may also be deployed in a similar manner (provided that the distance is replaced with an angle), and details are not described herein.

Step 2: Determine a division manner according to a width-to-height ratio.

It should be understood that there may be multiple manners for defining a width-to-height ratio of a sector region. For example, in FIG. 5(b), there is a highest point on a top arc of the sector region, there is also a lowest point in the region, and the height of the sector region may be (the highest point in the region+the lowest point in the region)/2. The width of the sector region may be an arc length corresponding to the sector region, and the arc length may be a length of an outer circumference of a sector including a middle point between the highest point in the region and the center of the circle; or the arc length may be a length of an outer circumference of a sector including a middle point between the lowest point in the region and the center of the circle; or may be an average value of the foregoing two.

When the width of the sector region is greater than the height of the sector region, the sector region is divided into two along a height direction in a longitudinal division manner; or when the height of the sector region is greater than the width of the sector region, the sector region is divided into two along a width direction in a latitudinal division manner. A height of a sector region in FIG. 5 is greater than a width of the sector region, and the latitudinal division manner should be used.

Step 3: Determine a division location.

It can be learned from FIG. 5 that all the four points $w_1$, $w_2$, $w_3$, and $w_4$ have respective weighted values, and a weighted value of each point may indicate an amount of spatial-temporal data distributed in a region corresponding to the point. The division location may be determined with reference to the weighted values of the points, so that a difference between a weighted value ratio of points in two sub-regions obtained by means of division and an area ratio of the two sub-regions is smallest. For example, in FIG. 5(c), a first sub-region includes three points, and a weighted value is 3+2+0.5=6.5; and a second sub-region includes one point, and a weighted value is 7. In this case, a division location needs to be selected to ensure that a difference between 6.5/7 and an area ratio of the first sub-region to the second sub-region is smallest. The foregoing division location may be determined by using an existing optimization algorithm (such as the Newton's steepest descent method), and details are not described herein.

Step 4: Move a point in the sector region according to a distance and a direction that are between a center line location in the division direction and the division location.

It should be understood that there may be multiple manners for defining a center line in the division direction and multiple manners for determining the center line location. For example, a center line in the height direction may be defined as an arc segment, a center line in the width direction may be defined as a line segment in a longitudinal direction. The center line in the height direction is used as an example.

The center line location needs to be selected to ensure that the areas of two sub-regions obtained by dividing the sector region along the center line location are close or even equal as much as possible. As shown in FIG. 5(c), after the division location is obtained, the four points in the sector region may be moved according to the distance and the direction (a direction indicated by an arrow in FIG. 5 (c)) that are between the center line location and the division location.

Step 5: Determine a sub-region that needs to be further divided, and repeat the foregoing steps.

FIG. 5(d) shows a first division result, and it can be learned from FIG. 5(d) that the first sub-region includes three points and needs to be further divided; and the second sub-region includes one point and does not need to be further divided. A subsequent division process of the first sub-region is similar to the foregoing process, reference may be made to FIG. 5(e) and FIG. 5(f), and details are not described herein again.

It should be noted that an example in which the timeline is the circular timeline based on the polar coordinates is used for description herein, but it should be understood that a rectilinear coordinate axis division manner is similar to that in the foregoing process, only manners for defining and selecting a center line location, a width, a height, a movement distance and direction of a point, and the like needs to be adjusted, and details are not described herein again.

The foregoing has described in detail, with reference to FIG. 1 to FIG. 5, the data visualization method according to the embodiments of the present disclosure. The following describes in detail, with reference to FIG. 6 to FIG. 7, a data visualization apparatus according to the embodiments of the present disclosure. It should be understood that apparatuses in FIG. 6 to FIG. 7 can implement all the steps in FIG. 1 to FIG. 5, and to avoid repetition, details are not described herein again.

Figure 6:
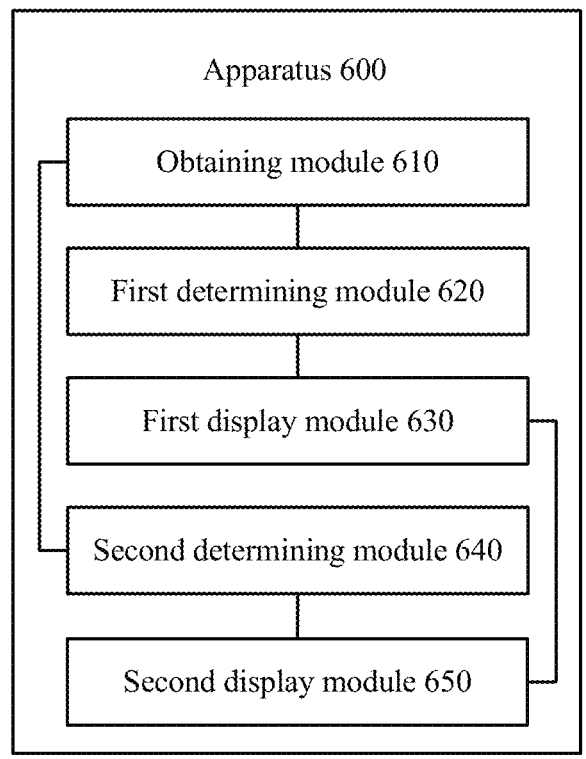
FIG. 6 is a schematic block diagram of a data visualization apparatus according to an embodiment of the present disclosure.

FIG. 6 is a schematic block diagram of a data visualization apparatus according to an embodiment of the present disclosure. The apparatus 600 in FIG. 6 includes:

an obtaining module 610, configured to obtain multiple pieces of spatial-temporal data, where each of the multiple pieces of spatial-temporal data records a time and a location at which an event occurs, locations recorded by the multiple pieces of spatial-temporal data are distributed in m preset regions, and m≥2;

a first determining module 620, configured to determine time-based distribution of the multiple pieces of spatial-temporal data according to time recorded by the multiple pieces of spatial-temporal data;

a first display module 630, configured to display a distribution curve diagram by using a display device, where the distribution curve diagram is used to represent the time-based distribution of the multiple pieces of spatial-temporal data, and the distribution curve diagram includes a timeline, a curve changing with the timeline, and an irregular region enclosed by the curve;

a second determining module 640, configured to determine distribution of the multiple pieces of spatial-temporal data in the m regions according to the locations recorded by the multiple pieces of spatial-temporal data; and a second display module 650, configured to display, by using the display device, a tree map in the irregular region according to the distribution of the multiple pieces of spatial-temporal data in the m regions, where the tree map divides the irregular region into m sub-regions that are in a one-to-one correspondence with the m regions, and an area of each of the m sub-regions is used to indicate an amount of spatial-temporal data distributed in a region corresponding to each sub-region.

In this embodiment of the present disclosure, a distribution curve diagram is used to display time-domain information of spatial-temporal data, a tree map is used to display region information of the spatial-temporal data, and a region change status of the spatial-temporal data with a time domain is displayed by combining the distribution curve diagram and the tree map, thereby implementing visualization of spatial-temporal data by using the tree map.

Optionally, in an embodiment, the timeline is a circular timeline based on polar coordinates, the curve is located in a circle enclosed by the circular timeline, and the irregular region is enclosed by the curve and radii of the circle.

Optionally, in an embodiment, the timeline is a rectilinear coordinate axis, and the irregular region is enclosed by the curve, the rectilinear timeline, and a vertical line perpendicular to the timeline.

Optionally, in an embodiment, the multiple pieces of spatial-temporal data are spatial-temporal data in a first subset of a spatial-temporal data set, the spatial-temporal data set includes n subsets, the first subset is any subset in the n subsets, the n subsets are in a one-to-one correspondence with n consecutive time segments, and a time recorded by spatial-temporal data in each subset falls within a time segment corresponding to each subset; and the apparatus further includes: a third display module, configured to display, on the timeline by using the display device, a distribution curve diagram and a tree map that are corresponding to another subset, other than the first subset, in the n subsets.

Optionally, in an embodiment, the timeline is a circular timeline based on polar coordinates, and a time corresponding to the circular timeline is 24 hours of a day.

Optionally, in an embodiment, the second display module 650 may be specifically configured to: deploy m points in the irregular region, where the m points are in a one-to-one correspondence with the m regions; determine a division location of the irregular region according to locations of the m points in the irregular region and distribution of an amount of the spatial-temporal data in the m regions, where the division location of the irregular region is used for dividing the irregular region into the m sub-regions, so that each of the m sub-regions includes one point in the m points; and display, by using the display device, the tree map obtained by dividing the irregular region according to the division location. The manner for dividing the irregular region in this embodiment of the present disclosure applies to displaying a tree map in an irregular region.

Optionally, in an embodiment, the second display module 650 may be specifically configured to perform the following steps: Step A: Determine that the irregular region is a to-be-processed target region; Step B: Determine a division direction of the target region according to a width-to-height ratio of the target region, where the division direction includes a latitudinal direction and a longitudinal direction, latitudinal division indicates dividing the target region into two along the width direction, and longitudinal division indicates dividing the target region into two along the height direction; Step C: Determine a target division location of the irregular region in the division direction according to the locations of all the m points in the target region and an amount of spatial-temporal data that is in the multiple pieces of spatial-temporal data and that is distributed in the regions corresponding to all the points, where the target division location is selected, so that a difference between an area ratio and a target ratio of a first sub-region to a second sub-region that are of two sub-regions obtained by dividing the target region along the target division location is smallest, and the target ratio is a ratio of an amount of spatial-temporal data distributed in a region corresponding to a point in the first sub-region to an amount of spatial-temporal data distributed in a region corresponding to a point in the second sub-region; Step D: Move a point in the irregular region according to a distance and a direction that are between a center line location of the target region in the division direction and the target division location; and Step E: When a quantity of points included in either of the two sub-regions is greater than 1, update the sub-region to the target region, and repeat step B to step D until the quantity of points included in either sub-region is 1.

Figure 7:
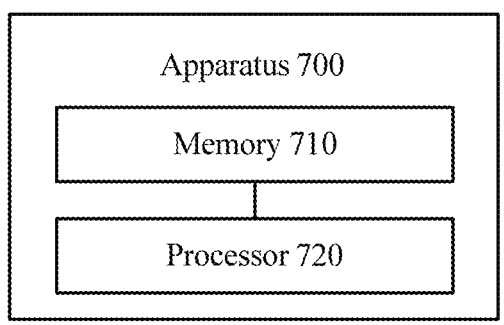
FIG. 7 is a schematic block diagram of a data visualization apparatus according to an embodiment of the present disclosure.

FIG. 7 is a schematic block diagram of a data visualization apparatus according to an embodiment of the present disclosure. The apparatus 700 in FIG. 7 includes:

a memory 710, configured to store a program; and a processor 720, configured to execute the program, where when the program is executed, the processor 720 is specifically configured to: obtain multiple pieces of spatial-temporal data, where each of the multiple pieces of spatial-temporal data records a time and a location at which an event occurs, locations recorded by the multiple pieces of spatial-temporal data are distributed in m preset regions, and m≥2; determine time-based distribution of the multiple pieces of spatial-temporal data according to time recorded by the multiple pieces of spatial-temporal data; display a distribution curve diagram by using a display device, where the distribution curve diagram is used to represent the time-based distribution of the multiple pieces of spatial-temporal data, and the distribution curve diagram includes a timeline, a curve changing with the timeline, and an irregular region enclosed by the curve; determine distribution of the multiple pieces of spatial-temporal data in the m regions according to the locations recorded by the multiple pieces of spatial-temporal data; and display, by using the display device, a tree map in the irregular region according to the distribution of the multiple pieces of spatial-temporal data in the m regions, where the tree map divides the irregular region into m sub-regions that are in a one-to-one correspondence with the m regions, and an area of each of the m sub-regions is used to indicate an amount of spatial-temporal data distributed in a region corresponding to each sub-region.

In this embodiment of the present disclosure, a distribution curve diagram is used to display time-domain information of spatial-temporal data, a tree map is used to display region information of the spatial-temporal data, and a region change status of the spatial-temporal data with a time domain is displayed by combining the distribution curve diagram and the tree map, thereby implementing visualization of spatial-temporal data by using the tree map.

Optionally, in an embodiment, the timeline is a circular timeline based on polar coordinates, the curve is located in a circle enclosed by the circular timeline, and the irregular region is enclosed by the curve and radii of the circle.

Optionally, in an embodiment, the timeline is a rectilinear coordinate axis, and the irregular region is enclosed by the curve, the rectilinear timeline, and a vertical line perpendicular to the timeline.

Optionally, in an embodiment, the multiple pieces of spatial-temporal data are spatial-temporal data in a first subset of a spatial-temporal data set, the spatial-temporal data set includes n subsets, the first subset is any subset in the n subsets, the n subsets are in a one-to-one correspondence with n consecutive time segments, and a time recorded by spatial-temporal data in each subset falls within a time segment corresponding to each subset; and the processor 720 is further configured to display, on the timeline by using the display device, a distribution curve diagram and a tree map that are corresponding to another subset, other than the first subset, in the n subsets.

Optionally, in an embodiment, the timeline is a circular timeline based on polar coordinates, and a time corresponding to the circular timeline is 24 hours of a day.

Optionally, in an embodiment, the processor 720 may be specifically configured to: deploy m points in the irregular region, where the m points are in a one-to-one correspondence with the m regions; determine a division location of the irregular region according to locations of the m points in the irregular region and distribution of an amount of the spatial-temporal data in the m regions, where the division location of the irregular region is used for dividing the irregular region into the m sub-regions, so that each of the m sub-regions includes one point in the m points; and display, by using the display device, the tree map obtained by dividing the irregular region according to the division location. The manner for dividing the irregular region in this embodiment of the present disclosure applies to displaying a tree map in an irregular region.

Optionally, in an embodiment, the processor 720 may be specifically configured to perform the following steps: Step A: Determine that the irregular region is a to-be-processed target region; Step B: Determine a division direction of the target region according to a width-to-height ratio of the target region, where the division direction includes a latitudinal direction and a longitudinal direction, latitudinal division indicates dividing the target region into two along the width direction, and longitudinal division indicates dividing the target region into two along the height direction; Step C: Determine a target division location of the irregular region in the division direction according to the locations of all the m points in the target region and an amount of spatial-temporal data that is in the multiple pieces of spatial-temporal data and that is distributed in the regions corresponding to all the points, where the target division location is selected, so that a difference between an area ratio and a target ratio of a first sub-region to a second sub-region that are of two sub-regions obtained by dividing the target region along the target division location is smallest, and the target ratio is a ratio of an amount of spatial-temporal data distributed in a region corresponding to a point in the first sub-region to an amount of spatial-temporal data distributed in a region corresponding to a point in the second sub-region; Step D: Move a point in the irregular region according to a distance and a direction that are between a center line location of the target region in the division direction and the target division location; and Step E: When a quantity of points included in either of the two sub-regions is greater than 1, update the sub-region to the target region, and repeat step B to step D until the quantity of points included in either sub-region is 1.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data visualization method, comprising:
obtaining multiple pieces of spatial-temporal data, wherein each of the multiple pieces of spatial-temporal data records a time and a location at which an event occurs, locations recorded by the multiple pieces of spatial-temporal data are distributed in m preset regions, and m≥2;

determining time-based distribution of the multiple pieces of spatial-temporal data according to time recorded by the multiple pieces of spatial-temporal data;

displaying a distribution curve diagram by using a display device, wherein the distribution curve diagram is used to represent the time-based distribution of the multiple pieces of spatial-temporal data, and the distribution curve diagram comprises a timeline, a curve changing with the timeline, and an irregular region enclosed by the curve;

determining distribution of the multiple pieces of spatial-temporal data in the m regions according to the locations recorded by the multiple pieces of spatial-temporal data; and displaying, by using the display device, a tree map in the irregular region according to the distribution of the multiple pieces of spatial-temporal data in the m regions, wherein the tree map divides the irregular region into m sub-regions that are in a one-to-one correspondence with the m regions, and an area of each of the m sub-regions is used to indicate an amount of spatial-temporal data distributed in a region corresponding to each sub-region, wherein displaying the tree map dividing the irregular region further comprises deploying m points in the irregular region, the m points being in a one-to-one correspondence with the m regions, and determining one or more division locations of the irregular region according to locations of the m points in the irregular region and a distribution of amounts of the spatial-temporal data in the m regions, the division locations of the irregular region being used for dividing the irregular region into the m sub-regions, such that each of the m sub-regions includes one point of the m points, and wherein at least one of the m sub-regions is bounded partially by the curve.

2. The method according to claim 1, wherein the timeline is a circular timeline based on polar coordinates, the curve is located in a circle enclosed by the circular timeline, and the irregular region is enclosed by the curve and radii of the circle.

3. The method according to claim 1, wherein the timeline is a rectilinear coordinate axis, and the irregular region is enclosed by the curve, the rectilinear timeline, and a vertical line perpendicular to the timeline.

4. The method according to claim 1, wherein the multiple pieces of spatial-temporal data are spatial-temporal data in a first subset of a spatial-temporal data set, the spatial-temporal data set comprises n subsets, the first subset is any subset in the n subsets, the n subsets are in a one-to-one correspondence with n consecutive time segments, and a time recorded by spatial-temporal data in each subset falls within a time segment corresponding to each subset; and the method further comprises:

displaying, on the timeline by using the display device, a distribution curve diagram and a tree map that are corresponding to another subset, other than the first subset, in the n subsets.

5. The method according to claim 1, wherein the timeline is a circular timeline based on polar coordinates, and a time corresponding to the circular timeline is 24 hours of a day.

6. A data visualization apparatus, comprising:

an obtaining module, configured to obtain multiple pieces of spatial-temporal data, wherein each of the multiple pieces of spatial-temporal data records a time and a location at which an event occurs, locations recorded by the multiple pieces of spatial-temporal data are distributed in m preset regions, and m≥2;

a first determining module, configured to determine time-based distribution of the multiple pieces of spatial-temporal data according to time recorded by the multiple pieces of spatial-temporal data;

a first display module, configured to display a distribution curve diagram by using a display device, wherein the distribution curve diagram is used to represent the time-based distribution of the multiple pieces of spatial-temporal data, and the distribution curve diagram comprises a timeline, a curve changing with the timeline, and an irregular region enclosed by the curve;

a second determining module, configured to determine distribution of the multiple pieces of spatial-temporal data in the m regions according to the locations recorded by the multiple pieces of spatial-temporal data; and a second display module, configured to display, by using the display device, a tree map in the irregular region according to the distribution of the multiple pieces of spatial-temporal data in the m regions, wherein the tree map divides the irregular region into m sub-regions that are in a one-to-one correspondence with the m regions, and an area of each of the m sub-regions is used to indicate an amount of spatial-temporal data distributed in a region corresponding to each sub-region, wherein displaying the tree map dividing the irregular region further comprises deploying m points in the irregular region, the m points being in a one-to-one correspondence with the m regions, and determining one or more division locations of the irregular region according to locations of the m points in the irregular region and a distribution of amounts of the spatial-temporal data in the m regions, the division locations of the irregular region being used for dividing the irregular region into the m sub-regions, such that each of the m sub-regions includes one point of the m points, and wherein at least one of the m sub-regions is bounded partially by the curve.

7. The apparatus according to claim 6, wherein the timeline is a circular timeline based on polar coordinates, the curve is located in a circle enclosed by the circular timeline, and the irregular region is enclosed by the curve and radii of the circle.

8. The apparatus according to claim 6, wherein the timeline is a rectilinear coordinate axis, and the irregular region is enclosed by the curve, the rectilinear timeline, and a vertical line perpendicular to the timeline.

9. The apparatus according to claim 6, wherein the multiple pieces of spatial-temporal data are spatial-temporal data in a first subset of a spatial-temporal data set, the spatial-temporal data set comprises n subsets, the first subset is any subset in the n subsets, the n subsets are in a one-to-one correspondence with n consecutive time segments, and a time recorded by spatial-temporal data in each subset falls within a time segment corresponding to each subset; and the apparatus further comprises:

a third display module, configured to display, on the timeline by using the display device, a distribution curve diagram and a tree map that are corresponding to another subset, other than the first subset, in the n subsets.

10. The apparatus according to claim 6, wherein the timeline is a circular timeline based on polar coordinates, and a time corresponding to the circular timeline is 24 hours of a day.

11. A non-transitory computer-readable medium comprising code which, when executed by a processor, causes the processor to perform a method comprising:

obtaining multiple pieces of spatial-temporal data, wherein each of the multiple pieces of spatial-temporal data records a time and a location at which an event occurs, locations recorded by the multiple pieces of spatial-temporal data are distributed in m preset regions, and m≥2;

determining time-based distribution of the multiple pieces of spatial-temporal data according to time recorded by the multiple pieces of spatial-temporal data;

displaying a distribution curve diagram by using a display device, wherein the distribution curve diagram is used to represent the time-based distribution of the multiple pieces of spatial-temporal data, and the distribution curve diagram comprises a timeline, a curve changing with the timeline, and an irregular region enclosed by the curve;

determining distribution of the multiple pieces of spatial-temporal data in the m regions according to the locations recorded by the multiple pieces of spatial-temporal data; and displaying, by using the display device, a tree map in the irregular region according to the distribution of the multiple pieces of spatial-temporal data in the m regions, wherein the tree map divides the irregular region into m sub-regions that are in a one-to-one correspondence with the m regions, and an area of each of the m sub-regions is used to indicate an amount of spatial-temporal data distributed in a region corresponding to each sub-region, wherein displaying the tree map dividing the irregular region further comprises deploying m points in the irregular region, the m points being in a one-to-one correspondence with the m regions, and determining one or more division locations of the irregular region according to locations of the m points in the irregular region and a distribution of amounts of the spatial-temporal data in the m regions, the division locations of the irregular region being used for dividing the irregular region into the m sub-regions, such that each of the m sub-regions includes one point of the m points, and wherein at least one of the m sub-regions is bounded partially by the curve.

12. The non-transitory computer-readable medium according to claim 11, wherein the timeline is a circular timeline based on polar coordinates, the curve is located in a circle enclosed by the circular timeline, and the irregular region is enclosed by the curve and radii of the circle.

13. The non-transitory computer-readable medium according to claim 11, wherein the timeline is a rectilinear coordinate axis, and the irregular region is enclosed by the curve, the rectilinear timeline, and a vertical line perpendicular to the timeline.

14. The non-transitory computer-readable medium according to claim 11, wherein the multiple pieces of spatial-temporal data are spatial-temporal data in a first subset of a spatial-temporal data set, the spatial-temporal data set comprises n subsets, the first subset is any subset in the n subsets, the n subsets are in a one-to-one correspondence with n consecutive time segments, and a time recorded by spatial-temporal data in each subset falls within a time segment corresponding to each subset; and the method further comprises:

displaying, on the timeline by using the display device, a distribution curve diagram and a tree map that are corresponding to another subset, other than the first subset, in the n subsets.

15. The non-transitory computer-readable medium according to claim 11, wherein the timeline is a circular timeline based on polar coordinates, and a time corresponding to the circular timeline is 24 hours of a day.

* * * * *